DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 7

T887,015
DEVELOPMENT OF PHOTOGRAPHIC MATERIALS

Edward C. Yackel, Kodak Park Division, Rochester, N.Y. 14650

Filed Nov. 16, 1970, Ser. No. 90,026
Int. Cl. G03c *5/26*
U.S. Cl. 96—63
No Drawing. 12 Pages Specification

Development of a latent image in an exposed, photographic silver halide emulsion layer is provided by contact of the emulsion layer with a metal which is magnesium, cadmium, zinc or iron in the presence of water and a silver halide developing agent, while in the absence of a sequestering agent. The silver halide developing agent is incorporated in the emulsion layer or a layer contiguous to the emulsion layer.